April 7, 1970 R. A. SCOTT 3,504,727
GUIDE FOR BEAD BREAKER SHOE ASSEMBLY
Filed March 7, 1968 2 Sheets-Sheet 1

INVENTOR.
RAY A. SCOTT

BY Hofgren, Wegner, Allen, Stellman & McCord.

ATTORNEYS.

April 7, 1970  R. A. SCOTT  3,504,727
GUIDE FOR BEAD BREAKER SHOE ASSEMBLY
Filed March 7, 1968  2 Sheets-Sheet 2

United States Patent Office 3,504,727
Patented Apr. 7, 1970

3,504,727
GUIDE FOR BEAD BREAKER SHOE
ASSEMBLY
Ray A. Scott, Fort Dodge, Iowa, assignor to The Coats
Company, Inc., a corporation of Iowa
Filed Mar. 7, 1968, Ser. No. 711,362
Int. Cl. B60c 25/08
U.S. Cl. 157—1.24    14 Claims

ABSTRACT OF THE DISCLOSURE

A guide for a bead breaker shoe utilized in forcing the side wall of a tire inwardly to separate the tire bead from the rim bead seat, characterized in that a movable locking member is associated with the bead breaker shoe to normally hold the shoe against movement radially inwardly with respect to the rim, the locking member being movable to a released position permitting free-swinging movement of the shoe after the shoe has moved axially past the rim periphery.

BACKGROUND OF THE INVENTION

Field of the invention

This invention relates to tire changing machines and more particularly to a guide means for a bead breaker shoe.

Description of the prior art

In recent years, the increasing number of different rim styles, sizes and shapes has necessitated the provision of a tire changing stand which would accommodate this proliferation of different rims and tire configurations. As a result, some tire changing stands have been made available which utilize structure that holds the vehicle rim by means which grip the edges of the rim. Examples of such structures are shown in the Belgian Duquesne Patent No. 689,769 and in the copending application of Strang et al. Ser. No. 661,686, filed Aug. 18, 1967, and assigned to the assignee of this invention. Generally speaking, in both the Duquesne patent and the copending Strang et al. application, a bead breaker shoe is normally held above a tire and rim with the shoe being pivotally connected to means vertically movable with respect to the tire and rim. As the shoe is moved downwardly, it engages the side wall of a tire mounted on the rim. Friction between the shoe and the tire side wall fixes the shoe against sliding relative to the side wall, and thus continued downward movement of the shoe causes it to pivot towards the wheel rim, moving radially inwardly relative thereto. As the downward movement continues, the bead breaker shoe moves the tire bead away from the rim bead seat and pushes it towards the drop center of the rim, to facilitate subsequent removal of the tire from the rim with the aid of suitable tire removal tools.

Recently tires have been made available which are extremely wide compared to previously available tires, the side walls of which bulge outwardly and extend well beyond the plane defined by the opposite circular rim edges. It has been found that in attempting to break the beads of these tires away from the rim bead seat, the bead breaker shoe has a tendency to engage the side wall of the tire and then toggle radially inwardly toward the center of the rim prior to the time that the shoe has moved axially past the rim flange. As a result, the shoe engages the flange on the downstroke, thereby terminating further movement of the shoe and interrupting the bead loosening operation. In addition, some vehicle rims are provided with a safety flange adjacent the rim bead seat and, on occasion, even in use with normal tires, there has been a tendency for the bead breaker shoe to toggle slightly inwardly prior to passing the rim flange and thereby become engaged with the rim.

Therefore, it has become desirable to provide a means for preventing the bead breaker shoe from moving radially towards the rim center until the shoe has moved axially past the rim edge.

SUMMARY OF THE INVENTION

This invention is directed, in brief, to the provision of a guide means for holding a pivoted bead breaker shoe, mounted for movement towards the tire side wall in a path generally parallel to the rim axis, against pivotal movement radially inwardly towards the rim center, until the bead breaker shoe has moved axially past the rim flange.

The best mode currently contemplated for accomplishing this result is the provision of a tongue which lies medially of, and above the bead breaker shoe, and is pivoted to the bead breaker shoe carriage. The tongue is provided with a rear surface which normally is positioned adjacent a portion of the bead breaker shoe to prevent swinging movement thereof, but pivots free of such position, permitting swinging movement of the bead breaker shoe, when the forward end of the tongue is engaged on the underside thereof, such as by coming into contact with a rim flange as the bead breaker shoe is moved axially downwardly relative to a rim.

DESCRIPTION OF THE PREFERRED
EMBODIMENT

Figure 1:
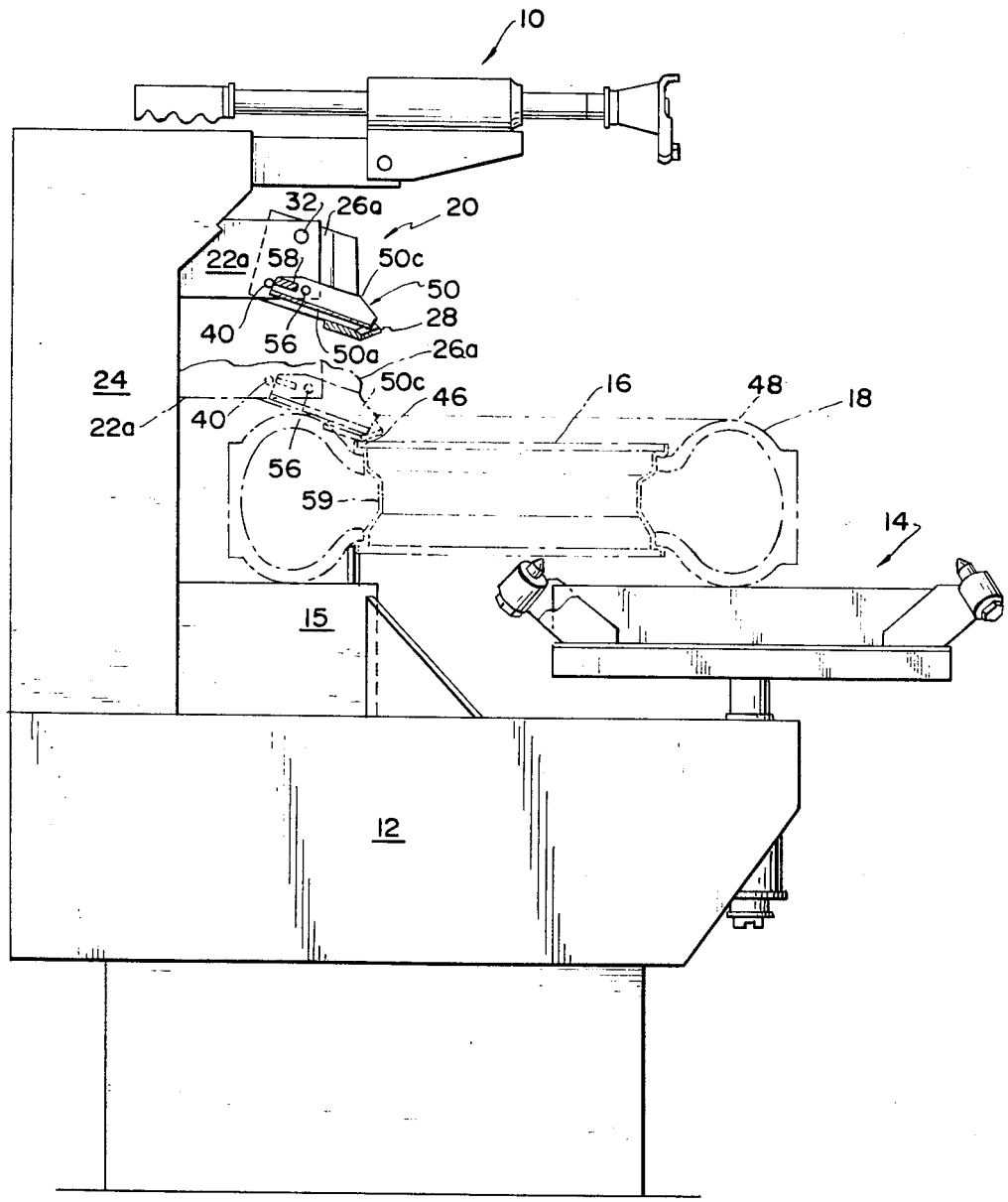
FIGURE 1 is a side elevational view of a tire changing stand embodying the bead breaker assembly of this invention.
Figure 2:
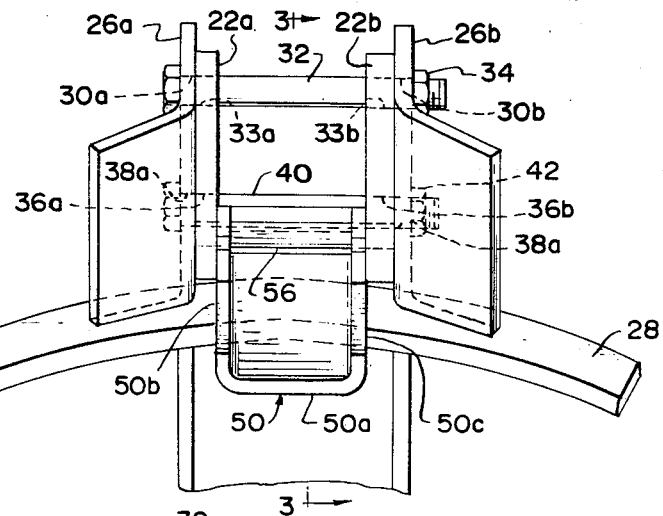
FIGURE 2 is a fragmentary front elevational view of the bead breaker shoe assembly of this invention.

Referring now to the drawings in FIGURE 1 there is shown a tire changing stand 10 having a base 12 on which is mounted a wheel support including rim gripping table 14 and supporting surface 15. Table 14 and surface 15 are intended to support a rim 16, with an associated tire 18, in a position for the tire to be engaged by bead breaker shoe assembly 20, to place the tire in a condition for removal from the rim responsive to actuation of the bead breaker shoe assembly which causes the tire bead to be moved away from the rim bead seat.

The tire changing stand 10 illustrated herewith is of the type disclosed in the copending application of Strang et al. Ser. No. 661,686, but it is to be understood that the invention disclosed herein is not specifically limited to use in such stands. As disclosed in the aforesaid copending application, the bead breaker shoe assembly is mounted on a pair of spaced arms 22 which are connected to a means (not shown) within column 24 for moving the arms toward and away from the wheel support as shown in dotted outline in FIGURE 1, such as in a generally vertical path, to thereby move the bead breaker assembly through the bead breaking cycle.

In the illustrated embodiment, the bead breaker shoe assembly includes a pair of substantially identical, generally L-shaped shoe plates 26a and 26b which mutually support an arcuate bead breaker shoe 28 on the underside thereof. Each plate has an opening 30a and 30b, respectfully, through which a suitable pivotal fastening means extends, such as bolt 32, as well as extending through openings 33a and 33b in the arms 22a and 22b, respectively. Bolt 32 is secured by nut 34 at one end. By this arrangement, the bead breaker shoe assembly is pivotally mounted relative to the arms 22 which, as previously discussed, are mounted for substantially vertical movement by means not shown but, by way of example, disclosed in the aforementioned copending Strang et al. application, Ser. No. 661,686.

Below the openings 33a and 33b, and slightly rearwardly thereof, the arms are provided with upwardly extending slots 36a and 36b, respectively. The plates are provided with openings 38a and 38b intended to be generally in registry with slots 36a and 36b. Another pin-like fastening means, such as bolt 40, extends through slots 36a and 36b, matingly occupies openings 38a and 38b and is provided with suitable fastening means, such as a nut 42, on one end thereof. By this arrangement, the shoe 28 is mounted for limited pivotal movement with respect to the arms 22a and 22b, the limit of the pivotal movement being determined by the extent of slots 36a and 36b. Generally speaking, the structure described to this point is substantially similar to that found in the aforementioned copending application of Strang et al. Ser. No. 661,686.

Means are provided associated with the shoe assembly for holding the shoe assembly against pivotal movement on its mounting until the shoe assembly has moved axially past the rim flange 46 following engagement with the tire side wall 48 adjacent the tire bead 48a. In the illustrated embodiment, this means includes a tongue-like member 50, shown herein as being generally U-shaped, extending generally forwardly and downwardly between arms 22a and 22b and projecting beyond shoe 28 in the central area of the arcuate shoe. Generally speaking, the tongue has a flat, elongate base 50a and upright side walls 50b and 50c. Side walls 50b and 50c have aligned openings 52a and 52b near the rear end of the tongue. Arms 22a and 22b also have openings 54a and 54b intended to be in alignment with openings 52a and 52b. The openings 52a, 52b and 54a, 54b are located generally below openings 30a and 30b and generally forwardly of openings 38a and 38b. A pin-like member 56 extends through the openings 52a, 52b and 54a, 54b to pivotally mount tongue 50 with respect to the shoe assembly.

Figure 3:
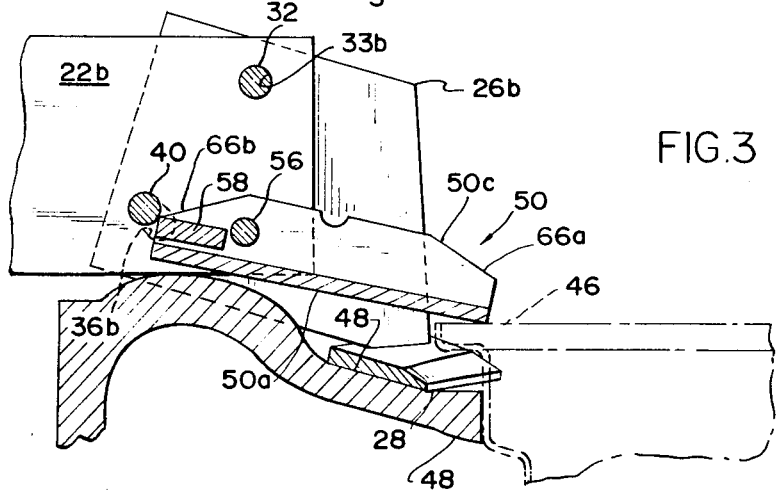
FIGURE 3 is a fragmentary sectional view taken generally along the lines 3—3 of FIGURE 2 showing the orientation of the components of the bead breaker assembly as the shoe moves initially past the rim flange of a wheel rim.
Figure 4:
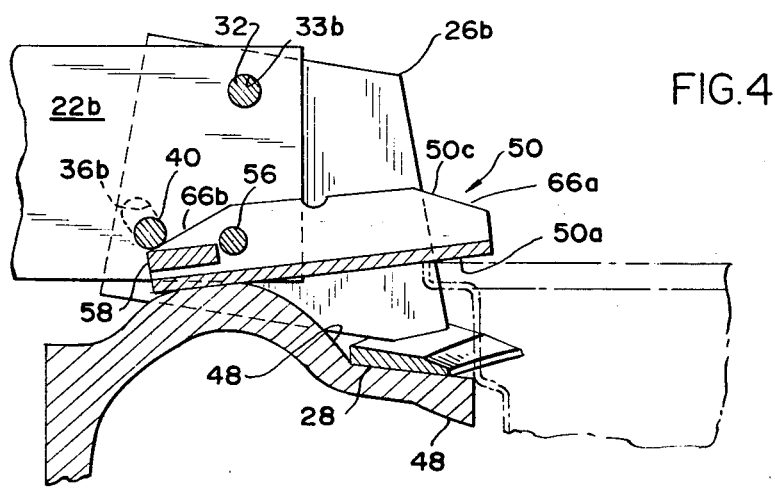
FIGURE 4 is a view similar to FIGURE 3 showing the orientation of the components of the bead breaker shoe assembly following release of the locking member upon further movement of the shoe past the rim flange.

Spanning the side walls 50b and 50c of tongue 50 at the rear end thereof is a cross bar 58 spaced slightly upwardly from base 50a. When the tongue 50 is pivoted downwardly so that it rests upon the shoe 28, bar 58 and the rear of walls 50b and 50c abut bolt 40 and hold the same at the upper and rearmost portion of slots 36a and 36b, thereby holding the shoe and shoe assembly in a retracted position. As the arms 22a and 22b are moved downwardly to bring the shoe into engagement with the tire side wall, the shoe is still held in the retracted position. As seen in FIGURE 3, further downward movement of the arms causes engagement of the shoe 28 with and compression of, the tire side wall 48 in the area adjacent the tire bead 48a. As seen in FIGURE 4, as the shoe 28 moves axially past the arcuate tire rim flange 46, the forward end of the tongue 50 engages the top of the rim flange 46. This causes the tongue 50 to be pivoted upwardly about pin 56, moving cross bar 58 and the rear end of side walls 50b and 50c below bolt 40. At this point, the shoe assembly is now free to pivot about bolt 32 so that continued downward movement of the arm also permits radially inward movement of the shoe 28 toward the drop center 59 of the rim, permitting the tire bead 60 to be pushed away from the rim bead seat 62 and into the drop center 59 of the rim 16. In this manner the tire 18 is ready for removal from the rim by appropriate tire tool instruments well known in the art.

To assist in the functioning of the tongue, the side walls of the tongue may be tapered at the forward end 66a and at the rear end 66b. The tapering at the rear end frees the bolt 40 for pivotal movement of the shoe assembly as soon as the side walls have been pivoted to a point where they clear the bolt.

This invention provides a reliable means for holding the bead breaker shoe of a tire changer retracted against movement radially inwardly towards the center of a vehicle rim until the shoe has traveled past the rim flange. This overcomes problems previously found in the art with respect to attempting to break the beads of extremely wide tires or with use with tires mounted upon rims having a safety flange. Previously, it was uncommon for the bead breaker shoe to move radially inwardly toward the center of the rim before having moved axially past the rim flange, thereby interrupting the bead breaking function. With this invention, the shoe is not freed for pivotal movement until the assembly has cleared the rim flange, at which time the shoe may continue to guide downwardly and inwardly and perform an effective bead breaking function.

The foregoing detailed description has been given for clearness of understanding only, and no unnecessary limitations should be understood therefrom, as some modifications may be obvious to those skilled in the art.

I claim:

1. A bead breaker shoe assembly for use in a tire changing stand, comprising: a bead breaker shoe pivotally connected to means in the stand for moving the shoe toward and away from a wheel support to separate tire beads from the rim bead seat of a wheel on the support, the shoe being pivoted for movement between a retracted and extended position relative to said moving means; a member connected to the stand for movement between a first position in abutment with the shoe in the retracted position to hold the shoe thereat, and being movable to a second position away therefrom permitting movement of the shoe to the extended position, the member having a rim engaging portion in a position to engage the rim of a wheel on the wheel support as the assembly moves therepast, such engagement moving the member to the second position permitting movement of the shoe to the extended position.

2. The shoe assembly of claim 1 wherein the shoe is generally arcuate and the member projects medially outwardly of the shoe.

3. The shoe assembly of claim 2 wherein the member is pivotally connected to the stand.

4. The shoe assembly of claim 1 wherein the shoe is mounted on an arm by a pin and slot arrangement and the member abuts one of the pin and shoe to hold the same in the retracted position.

5. The shoe assembly of claim 4 wherein the member is also pivoted to the arm and is normally gravity urged to the first position wherein it abuts one of the pin and the shoe, engagement of the rim engaging portion with a wheel rim moving the member about its pivotal mounting and permitting free movement of the shoe to the extended position.

6. The shoe assembly of claim 5 wherein the shoe is generally arcuate and the member rim engaging portion projects medially outwardly of the shoe between the ends thereof.

7. The shoe assembly of claim 6 wherein the member has a rear portion which normally engages one of the pin and shoe assembly, the rear portion being at an end of the member opposite from the rim engaging portion.

8. A bead breaker shoe assembly for use in a tire changing stand having a wheel supporting surface for holding a vehicle rim and tire in a position to be engaged by a bead breaker shoe for separation of the tire bead from the wheel rim comprising: a pair of arms movably mounted in the stand for movement toward and away from the wheel supporting surface, a bead breaker shoe connected to a pair of shoe plates, the shoe plates embracing the arms and pivotally connected thereto; means mounting the shoe for limited pivotal movement relative the arms including a pin extending through slots in one of the arms and shoe plates and openings in the other of the arms and shoe plates; a member pivoted to the arms and gravity urged to a position normally in abutment with one of the pin and shoe plates to hold the same in a retracted position; the member having a rim engaging portion which is positioned in the shoe assembly relative to the other components thereof to engage a vehicle rim held on the wheel supporting surface as the assembly is moved therepast, such engagement moving the member to a second position out of abutment with one of the pin and shoe plates permitting free pivotal movement of the shoe to an extended position.

9. The shoe assembly of claim 8 wherein the shoe is arcuate and the rim engaging portion of the member extends medially outwardly of the shoe between the ends thereof.

10. The shoe assembly of claim 9 wherein the member is positioned between the arms and pivoted intermediate its ends and positioned above the bead breaker shoe.

11. The shoe assembly of claim 10 wherein the member is generally U-shaped, having a base and upstanding side walls which lie adjacent the arms.

12. The shoe assembly of claim 11 wherein the side walls are tapered at the end thereof opposite the rim engaging portion.

13. The bead breaker assembly of claim 11 wherein the pin receiving slots are in the arms and wherein the end of the member opposite the rim engaging portion normally abuts the pin to hold the shoe in the retracted position.

14. The shoe assembly of claim 12 wherein the upper ends of the side walls are tapered adjacent the rear end of the member.

References Cited

UNITED STATES PATENTS

| | | | |
|---|---|---|---|
| 2,485,202 | 10/1949 | Kelly | 157—1.2 |
| 3,052,285 | 9/1962 | Kochauer | 157—1.2 |
| 3,255,800 | 6/1966 | Strong et al. | 157—1.24 |

GRANVILLE Y. CUSTER, JR., Primary Examiner